Aug. 24, 1937.  W. BORENSTEIN ET AL  2,090,934
CLUTCH DEVICE
Filed March 19, 1936
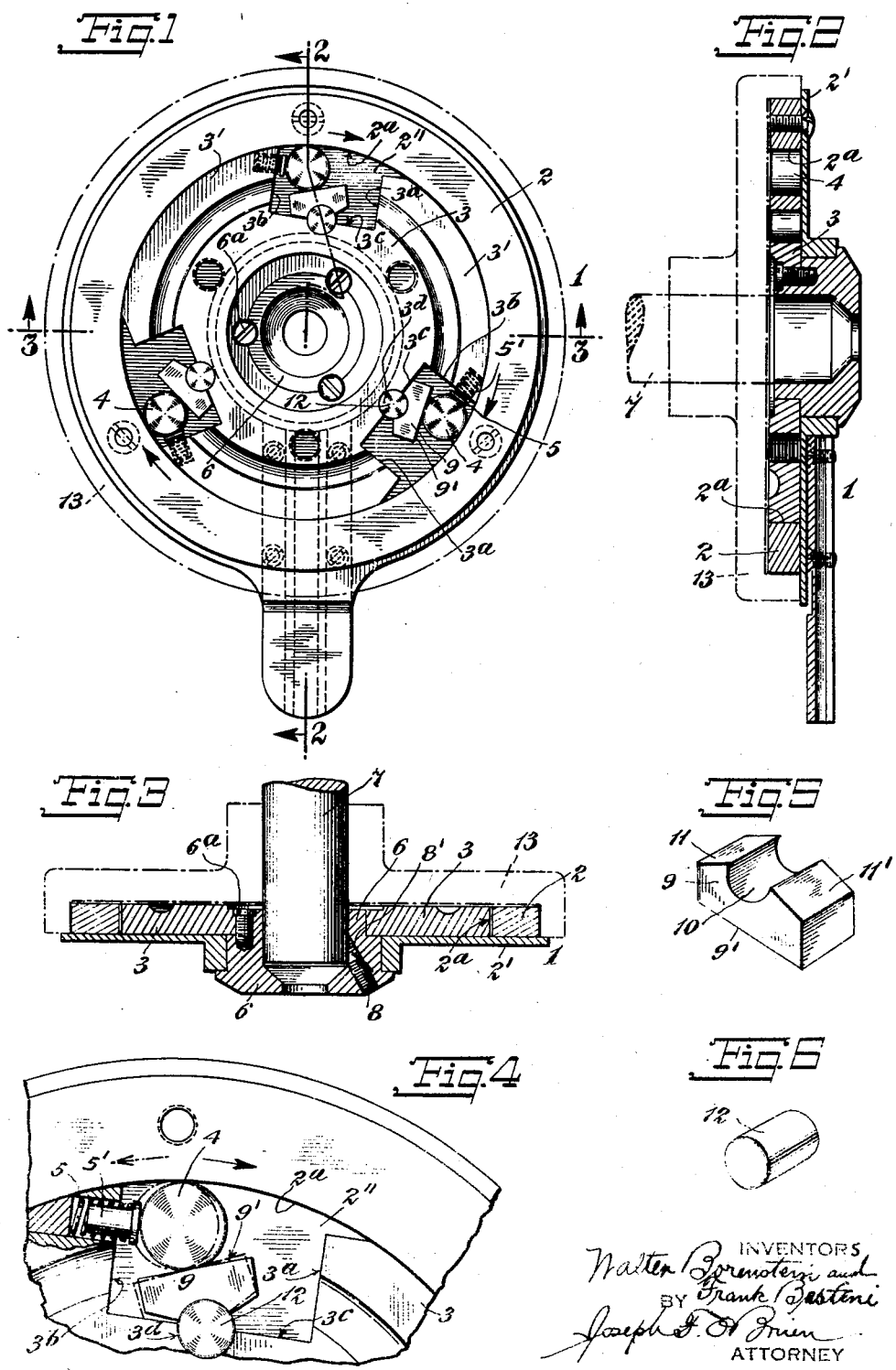

Patented Aug. 24, 1937

2,090,934

UNITED STATES PATENT OFFICE 2,090,934

CLUTCH DEVICE

Walter Borenstein, Brooklyn, and Frank Basteni, New York, N. Y.; said Basteni assignor to said Borenstein Application March 19, 1936, Serial No. 69,648

7 Claims. (Cl. 192—45)

This invention relates to improvements in clutch devices, and is particularly useful in intermittent driving mechanism for high-speed shafts used in sewing machines and the like.

In the operation of such intermittent driving mechanisms, it is common to use spring-pressed roller detents arranged in wedging channels and cooperating at one side with a wedging surface on a carrier to engage and interlock with a cylindrical surface on a rotating member so as to grip and prevent movement in one direction while releasing to permit movement in the opposite direction. As the roller always impinges against the carrier wedging-surface at one place or line, uneven wear results with the formation in the carrier wedging-surfaces of arcuate depressions or pockets due to digging in of the roller detents and this often causes failure of the clutch device with consequent unsatisfactory operation and short life of the intermittent driving mechanism.

It is one of the objects of this invention to overcome the aforesaid difficulties by providing means for causing an even wear between the roller and the carrier wedging-surface and to avoid or eliminate the formation in said surface of pockets, thus resulting in a lengthening of the life of the mechanism and satisfactory operation thereof.

Another object of our invention is to utilize wedging-surface members of sectional character, which will provide an anti-locking breakable-joint with the carrier and will also be capable of ready and facile replacement.

Another object of this invention is, in a device of the character specified, to provide on the carrier a replaceable wedging-surface member which will be capable of replacement at an economical cost.

Another object of our invention is to utilize a replaceable member having a plurality of wedging surfaces, and which is reversible, when worn on one wedging surface so as to be used a second time.

In general terms, our invention comprises the utilization of a sectional, movable wedging-surface member which will, during the clutching or wedging and releasing operations respectively of the clutch, be capable of a slight movement which is adapted in turn to cause a slight movement of the roller detent in relation to the carrier wedging surface cooperating therewith, thus preventing the said roller from digging into the metal wall of the carrier wedging-surface and resulting in a distribution and equalization of the wear of the said wedging surface.

More particularly our invention comprises the employment of a sectional wedging surface member which is replaceable and tiltable about a suitable pivot member and which in addition to the advantages above specified, will facilitate the gripping and releasing action of the clutch by preventing excessive frictional contact and providing an anti-locking though secure wedging or clutching surface which is less rigid and is more readily movable and disconnectible during the releasing movement of the clutch.

With these and other objects in view, our invention comprises the combination of members and arrangement of parts so combined as to coact and co-operate with each other in the performance of the functions and the accomplishment of the results herein contemplated and comprises in one of its adptations the species or preferred forms illustrated in the accompanying drawing, in which:

Fig. 1 is a front view of a clutch embodying our invention;

Fig. 2 is a vertical section taken on the line 2—2 of Fig. 1, looking in the direction of the arrows;

Fig. 3 is a longitudinal section taken on the line 3—3 of Fig. 1, looking in the direction of the arrows;

Fig. 4 is an enlarged fragmentary view of our clutch showing in exaggerated form the action that takes place;

Fig. 5 is a perspective of one of our pivoted sectional wedging-surface members;

Fig. 6 shows a detail view of one of the pivot pins.

Referring now to the drawing, which illustrates a preferred embodiment of our invention, 1 in Figs. 1, 2 and 3 indicates an assembled clutch device suitable for use with intermittent driving mechanism of sewing machines and like mechanisms wherein high-speed shafts are usually employed.

The clutch device comprises an annular member 2 forming with the disc 2' a circular internal mounting cavity or space having an internal cylindrical surface 2ª. In said cavity is disposed a detent carrier member 3 suitably mounted for rotation within said cavity for cooperation of its detents with said internal cylindrical surface 2ª. As shown, the carrier 3 has segmental sections 3' substantially conforming to and contacting with said internal cylindrical surface 2ª of the annular member 2 except for the slight eccentricity hereinafter noted. Said carrier 3 is also provided at suitable positions around its periphery with detent-housing recesses 2"

having side and bottom walls $3^a$, $3^b$, $3^c$ and opening on said cylindrical surface to provide within the annular cavity a plurality of and preferably three detent-housing recesses $2''$ within each of which is mounted in cooperative relationship with said cylindrical surface a spring-pressed roller-detent 4 which is forced outwardly from the side wall $3^b$ of said recess by a plunger and spring $5'$ seated within a bore 5 in said wall $3^b$. In the construction shown, the carrier 3 is rotatably mounted within the annular member 2 by an axial sleeve 6 having a flange extending to the outer surface of the plate $2'$ and connected to the carrier by a series of screws $6^a$. The sleeve 6, thus fastened to the carrier 3 and mounted on the disc $2'$ is adapted to be connected to a shaft 7, by set screw 8, extending through inclined bores $8'$, or in any other suitable manner.

In conventional clutching devices, one side of the cylindrical or rounded surface of the detent 4 impinges against the relatively stationary bottom wall $3^c$ of the recess in the carrier and this wall is inclined in relation to a radius to the cylindrical surface which passes through the axis of the roller detent so as to press the roller detent 4 into clutching or wedging engagement with the said cylindrical surface $2^a$ of the member 2. In these clutching devices the cylindrical rounded surface of the detent, after a relatively short period of time, digs into the bottom wall of the carrier against which it impinges and when it digs any appreciable distance the clutching action of the device is destroyed.

In accordance with our present invention, we utilize means for causing detent 4, during the clutching action thereof, to move a short distance in relation to the wedging surface of the carrier and we find that if this detent is caused to move approximately ⅛ of an inch during said clutching action, the roller-detent will be prevented from digging in, and the life of the clutch device will be greatly lengthened. In the preferred form of our invention, we purposely make the carrier element and the cylindrical surface eccentric in relation to each other to a degree that will cause substantially an eighth of an inch movement of the detent in relation to the normal wedging surface of the carrier member against which it impinges and we find that in the sizes of ordinary or conventional clutches used in sewing machine driving mechanisms, a degree of eccentricity amounting to approximately three to seven thousandths of an inch is desirable and that an eccentricity of less than two thousandths of an inch between such members would not produce a movement between the detent and the wedging surface of the carrier of sufficient extent to be of value in avoiding a digging in of the detent. In our experiments we have utilized a darkened wedging surface and the movement of the detent has produced a bright band thereon of approximately ⅛ of an inch, and we find that a band of such width is highly efficient in preventing the digging into such surface of the said detent.

In the preferred embodiment of our invention we provide on the carrier 3 within each of the peripheral detent-housing recesses $2''$ a sectional and separable wedge-member 9 having a wedging surface $9'$ which, when the member 9 is mounted, will similarly be inclined in relation to a radius to the cylindrical surface which passes through the axis of the detent roller. In the preferred form of our invention illustrated, the wedge member comprises a relatively small wedge-block having intermediate its ends a pivot channel 10, and on opposite sides of said pivot channel a pair of contact-surfaces 11, $11'$. As illustrated the contact-surfaces 11, $11'$ are inclined in relation to the wedging surface $9'$ and these contact-surfaces abut against a bottom recess wall $3^c$ disposed at a proper angle to position the blocks 9. We preferably provide a plurality of said wedge blocks 9, and each of them is pivoted upon a pivot member 12 partially fitting within the arcuate channel 10 of the wedge block and in part fitting within a similar arcuate channel $3^d$ in the carrier wall $3^c$ of the detent housing recess $2''$. When the block 9 is pivotally mounted on the pivot 12, the surface $9'$ will extend in a plane inclined in relation to a radius of the cylindrical surface $2^a$ passing through the axis of the roller and thus providing a surface capable of wedging the roller detent 4 against the cylindrical surface $2^a$.

In the preferred form of our invention shown, the inclination of one of the contact surfaces 11, $11'$ controls the position of the wedging surface $9'$, but it will be obvious that any suitable means may be utilized to position the contact surface $9'$ properly, though the provision of a block with one or more contact surfaces inclined in relation to the wedging surface $9'$ forms a means of mounting the said surface $9'$ in proper wedging relationship to the roller detent 4 and to the cylindrical surface $2^a$.

In the said preferred embodiment of our invention, the block 9 is reversible to permit first one of the inclined contact portions 11, $11'$ to abut against the wall $3^c$, and then the other, thus changing the position of contact of the wedging surface in relation to the roller detent and enabling the renewal of the wedging surface when a part of the same is worn in one place by the roller detent.

It will be seen, as illustrated in Fig. 4, that the annular member 2 and the cylindrical surface $2^a$, will be permitted to rotate in the direction of the arrow in broken lines, and said cylindrical surface will be capable of moving freely in that direction notwithstanding the pressing by the spring-pressed plunger $5'$ of the detent into wedging relationship with said cylindrical surface. When, however, it is attempted to move the cylindrical surface $2^a$ in the opposite direction, the detent will wedge and interlock between the wedge block and said cylindrical surface $2^a$, and owing to the fact that the wedge block 9, has a readily breakable joint with the wall $3^c$ of the recess $2''$, the clutching and releasing action of the detent will not only be accelerated but the detent will be caused to move a greater distance along the wedging surface $9'$ of the block 9 than would be possible if the said wedging surface was stationary or fixed. This relatively elongated movement of the roller detent along the wedging surface will prevent any digging by the detent into the wedging surface. Instead therefore of the detent forming an arcuate depression in the wedging surface with a resulting pocketing and unsatisfactory operation or failure, said relative movement of the roller-detent in relation to said wedging surface provides a flat engaging portion which causes the wedging surface to continue to co-act and co-operate with the roller for a much longer period of time than is possible when the wedging surface only contacts at a single line with the arcuate surface of the roller detent. It will be understood that the movement of the roller detent is very slight, but this slight movement is sufficient to prevent an arcuate depression as aforesaid and to provide for a flat-wearing surface which will, as aforesaid, greatly prolong the life of the wedging elements and of the assembled clutch.

In the form of our invention shown, the clutching device may be provided with an outer shell 13, shown in dotted lines which may be mounted, in any conventional manner.

It will be obvious from the above that the provision of means for moving the roller detent relatively to the wedging surface and thus eliminating arcuate pockets in said wedging surface and instead providing flat wear-surfaces between the wedging detent and the carrier constitutes a very important part of our invention, and it will be understood that the increase of this movement within certain limits will be desirable. We preferably, therefore, increase the movement of the detent in relation to the wedging surface and thus increase the length of flat inter-wearing-surface between said members by mounting the carrier in slightly eccentric relationship to the rotating cylindrical surface 2ᵃ or vice versa, and preferably to the extent hereinabove specified.

Having described our invention, we claim:

1. A clutch device for intermittent driving mechanism embodying in combination, a rotatable clutch member having a cylindrical surface, another clutch member comprising a detent carrier rotatable in proximity to said cylindrical surface and having peripheral detent-mounting recesses adjacent thereto, separable wedge members having wedging surfaces and mounted in said recesses to permit a limited tilting movement of said wedging surfaces during a clutching action, spring-pressed roller detents also mounted in said recesses, each of said detents having coacting contact with said cylindrical surface and with the wedging surface of a separable wedge member.

2. A clutch device for intermittent driving mechanism embodying in combination, a rotatable clutch member having a cylindrical surface, another clutch member comprising a detent carrier rotatable in proximity to said cylindrical surface and having peripheral detent-mounting recesses adjacent thereto, said recesses having bottom and side walls, separable wedge members mounted in said recesses in contact with the bottom walls thereof and having wedging surfaces, spring-pressed roller-detents also mounted in said recesses in coacting relationship with said wedging and cylindrical surfaces, said wedge members being provided with a contact surface inclined in relation to said wedging surface and adapted to abut against the bottom wall of said recess.

3. A clutch device for intermittent driving mechanism embodying in combination, a rotatable clutch member having a cylindrical surface, another clutch member comprising a detent carrier rotatable in proximity to said cylindrical surface and having peripheral detent-mounting recesses adjacent thereto, said recesses having bottom and side walls, separable wedge members mounted in said recesses in contact with the bottom walls thereof and having wedging surfaces, spring-pressed roller-detents also mounted in said recesses in coacting relationship with said wedging and cylindrical surfaces, said wedge members being provided with a plurality of contact surfaces inclined in relation to said wedging surface and adapted to abut against the bottom wall of the recess.

4. A clutch device for intermittent driving mechanism embodying in combination, a rotatable clutch member having a cylindrical surface, another clutch member comprising a detent carrier rotatable in proximity to said cylindrical surface and having peripheral detent-mounting recesses adjacent thereto, said recesses having bottom and side walls, separable wedge members mounted in said recesses in contact with the bottom walls thereof and having wedging surfaces, spring-pressed roller-detents also mounted in said recesses in coacting relationship with said wedging and cylindrical surfaces, said wedge members also being provided with a contact surface inclined in relation to said wedging surface and adapted to abut against the bottom wall of said recess, said wedge members comprising blocks having a portion intermediate the ends thereof pivoted on said bottom recess wall.

5. A clutch device for intermittent driving mechanism embodying in combination, a rotatable clutch member having a cylindrical surface, another clutch member comprising a detent carrier rotatable in proximity to said cylindrical surface and having peripheral detent-mounting recesses adjacent thereto, said recesses having bottom and side walls, separable wedge members mounted in said recesses in contact with the bottom walls thereof and having wedging surfaces, spring-pressed roller-detents also mounted in said recesses in coacting relationship with said wedging and cylindrical surfaces, said wedge members provided with a contact surface inclined in relation to said wedging surface and adapted to abut against the bottom wall of said recess, said wedge members comprising blocks having a portion intermediate the ends thereof pivoted on said bottom recess wall, and separate pivot members for said blocks.

6. A clutch device for intermittent driving mechanism embodying in combination, a rotatable clutch member having a cylindrical surface, another clutch member comprising a detent carrier rotatable in proximity to said cylindrical surface and having peripheral detent-mounting recesses adjacent thereto, said recesses having bottom and side walls, separable wedge members mounted in said recesses in contact with the bottom walls thereof and having wedging surfaces, spring-pressed roller-detents also mounted in said recesses in coacting relationship with said wedging and cylindrical surfaces, said wedge members being provided with a contact surface inclined in relation to said wedging surface and adapted to abut against the bottom wall of said recess, said wedge members comprising blocks having a portion intermediate the ends thereof pivoted on said bottom recess wall, said contact surfaces being positioned at opposite sides of said pivoted block portions.

7. A clutch device for intermittent driving mechanism embodying in combination, a rotatable clutch member having a cylindrical surface, another clutch member comprising a detent carrier rotatable in proximity to said cylindrical surface and having peripheral detent-mounting recesses adjacent thereto, said recesses having bottom and side walls, separable wedge members mounted in said recesses in contact with the bottom walls thereof and having wedging surfaces, spring-pressed roller-detents also mounted in said recesses in coacting relationship with said wedging and cylindrical surfaces, said wedge members being provided with a contact surface inclined in relation to said wedging surface and adapted to abut against the bottom wall of said recess, said wedge members comprising blocks having a portion intermediate the ends thereof pivoted on said bottom recess wall, and separate pivot members for said blocks, said contact surfaces being positioned at opposite sides of said pivoted block portions.

WALTER BORENSTEIN.
FRANK BASTENI.